March 5, 1968   K. STEIMEL ETAL   3,372,329
VOLTAGE CONTROL SYSTEM
Filed Sept. 24, 1963

Inventors:
Karl Steimel,
Klemens Heumann
By: Spencer & Kaye
ATTORNEYS

United States Patent Office 3,372,329
Patented Mar. 5, 1968

3,372,329
VOLTAGE CONTROL SYSTEM
Karl Steimel, Konigstein-Johanniswald, Taunus, and Klemens Heumann, Berlin-Reinickendorf, Germany, assignors to Licentia Patent-Verwaltungs-GmbH, Frankfurt am Main, Germany
Filed Sept. 24, 1963, Ser. No. 311,162
Claims priority, application Germany, Sept. 27, 1962, L 43,082
17 Claims. (Cl. 323—22)

The present invention relates to an arrangement for distributing the voltage equally among a plurality of serially connected, controllable semiconductor elements forming part of a pulse or switching circuit.

A conventional circuit of this type is shown in FIGURE 1, the circuit being used to feed a direct current machine 2, such as a motor, from a source of electrical energy such as a battery 1, the latter being connected across the motor and its series winding 3. The torque or rotational speed of the motor is controlled by the intermittent application of energy from the battery 1. The circuit is opened and closed, i.e., the flow of energy is controlled, by means of controllable semiconductor elements 4, 104. The output of the machine 2 is increased so long as the semiconductor elements 4, 104 pass current, whereas when the controllable semiconductor elements 4, 104 are in non-conductive state, the D.C. machine is energized, with a decaying current, by the energy of an inductance connected in circuit with the machine, e.g., the series winding 3. During this time, current flows through the by-pass diodes 5, 105. The semiconductor elements 4, 104 are rendered non-conductive by means of the control circuit 6.

Since the capacity of existing semiconductor elements is very limited, it is, if a larger power output is to be obtained, often necessary to provide a plurality of serially connected semiconductor elements, as is, in fact, shown in FIGURE 1. It has been found, however, that unequal voltage distribution across the various individual semiconductor elements may result in an overvoltage in either forward or backward direction. It is true that the circuit may be provided with means for controlling the voltage distribution among the semiconductor elements, such as ohmic and capacitative elements which distribute the voltage equally among the serially connected semiconductor elements, but even this will not prevent overvoltages of short duration from appearing across the individual semiconductors if the same have different recovery times.

It is therefore, the primary object of the present invention to provide a circuit arrangement which overcomes the above drawbacks, namely, a circuit arrangement in which the voltage is distributed equally among a plurality of serially connected semiconductor elements of a pulse circuit of the above type.

With the above object in view, the present invention resides mainly in an arrangement of the above type, wherein either the source of electric energy and/or the load which is fed from this source is provided with a tap, and wherein each of the controllable semiconductor elements is so connected to the tap as to operate at but a portion of the voltage of the circuit as a whole.

More particularly, the present invention resides in a circuit arrangement which comprises a source of electric energy and a load, tap means provided on either the source or the load for dividing the same into at least two portions, and a pulse circuit connected in series or parallel with the source and the load, which pulse circuit includes at least two controllable semiconductor elements one of which elements is connected with one of the portions of the component which is provided with the tap means, while the other of the two controllable semiconductor elements is connected with the other portion.

Additional objects and advantages of the present invention will become apparent upon consideration of the following description when taken in conjunction with the accompanying drawings in which:

FIGURE 1, already referred to above, is a circuit diagram of a conventional circuit arrangement in which a source of electric energy is connected to a load by means of a pulse circuit.

Figure 1:
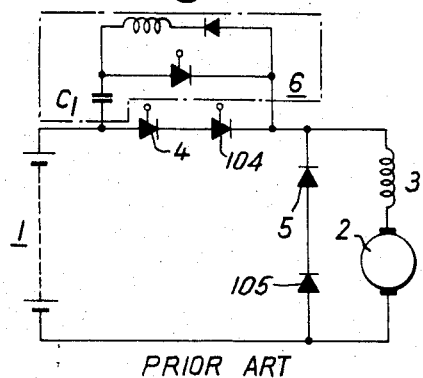
Figure 2:
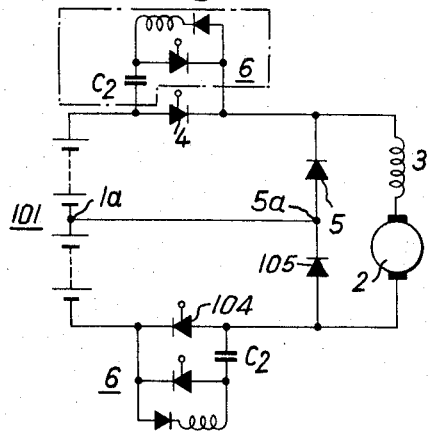
FIGURE 2 shows a circuit similar to FIGURE 1 but modified in accordance with the present invention.

Referring now once again to the drawings, FIGURE 2 shows the circuit of FIGURE 1 as being, in effect, divided into two pulse circuits, the battery 101 being provided with a center tap 1a which is connected to the juncture 5a of the two serially connected by-pass diodes 5, 105. Each of the two pulse circuits operates at half the total supply voltage of the battery so that the voltage will perforce be evenly distributed among the controllable semiconductor elements. The circuit of FIGURE 2 incorporates two capacitors $C_2$ each having twice the capacitance of the capacitor $C_1$ of FIGURE 1, but since each of the two capacitors $C_2$ of FIGURE 2 has to be designed for but half the operating voltage, the over-all size of the capacitors is not increased to any significant extent.

Another advantage of the circuit incorporating a center-tapped battery such as is shown in FIGURE 2 is that, in case the operating conditions make it desirable to run the load with but half the voltage of the battery 1, one of the two pulse circuits alone can be used to run the load; during this operation, the controllable semiconductor element of the other pulse circuit will be kept in its non-conductive state. If, under such conditions, both halves of the battery are to be discharged evenly, all that is necessary is to alternate periodically between the two battery halves.

Another advantage of the present invention over the prior art circuit is that the new circuit can be operated as follows: the semiconductor element pertaining to one of the two halves of the source of electric energy can be kept in its conductive state, while the current regulation is effected solely by means of the semiconductor element pertaining to the other half. In this way, the voltage across the load will fluctuate between the total battery voltage V and $V/2$.

Figure 3:
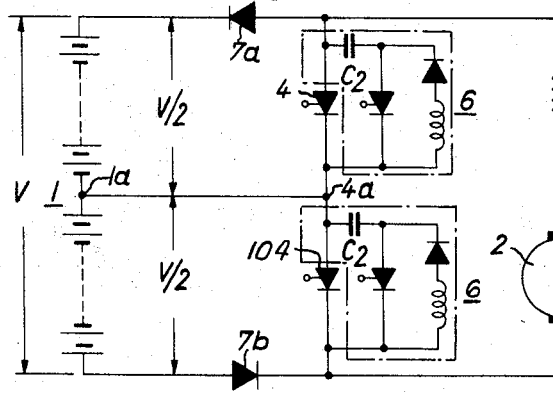
FIGURE 3 is a circuit diagram of a modification of the circuit of FIGURE 2.

FIGURE 3 shows a circuit arrangement of the above type in which the direct current machine 2 acts as a generator for charging the source of electric energy 1. Here, the series winding 3 will, due to a short-circuit current through the controllable semiconductor elements 4, 104 and the direct current machine acting as a generator, be charged with energy, which energy is fed to the battery 1 via diodes 7a, 7b, during the time intervals when the controllable semiconductor elements 4, 104 whose junction 4a is connected to the battery tap 1a, are rendered non-conductive by their respective control circuits 6.

The circuit of FIGURE 3 can also be operated in the manner described above in connection with FIGURE 2, i.e., the semiconductor element pertaining to one of the two halves can be kept conductive or non-conductive, while the voltage regulation is effected solely by means of the semiconductor element pertaining to the other half.

Figure 4:
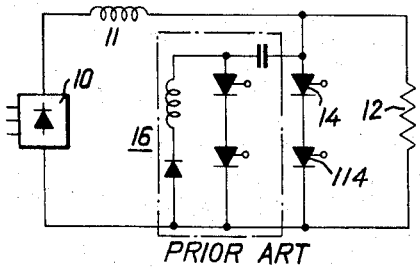
FIGURE 4 is a circuit diagram of another conventional circuit in which a source of electric energy is connected with a load.
Figure 5:
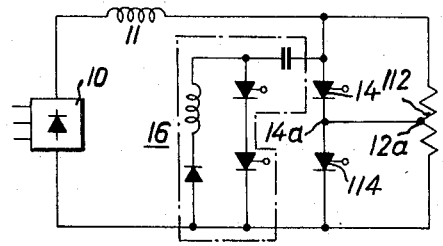
FIGURE 5 shows a circuit similar to FIGURE 4 but modified in accordance with the present invention.

FIGURE 4 shows another prior art circuit in which a load such as a resistance 12 is fed from a source of direct current energy 10 via an inductance 11. Here, too, there are two controllable semiconductor elements 14, 114 which are rendered non-conductive by means of a control circuit 16. In order to obtain an even current distribution, all that is required is that the juncture 14a of the two serially connected semiconductor elements 14, 114 be connected with a suitable tap 12a of the pulse-controlled resistance 112, as shown in FIGURE 5.

Figure 6:
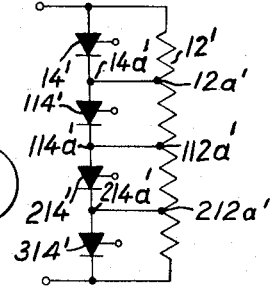
FIGURE 6 is a fragmentary circuit diagram showing a modification of the circuit of FIGURE 5.

If the pulse circuit incorporates more than two serially connected controllable semiconductor elements 14', 114', 214', 314', the resistance 12' may, as shown in FIGURE 6, be provided with a plurality of taps 12a', 112a', 212a' equal in number to the number of junctures, 14a', 114a', 214a', between consecutive controllable semiconductor elements, each tap being connected to a corresponding one of the junctures.

It will be seen from the above that thanks to the present invention, each of the individual controllable semiconductor elements is operated at a voltage which is no greater than the fraction of the total voltage at which the respective portion of the source of direct current or the load is operated.

The pulse circuit and the control circuits per se are conventional and a description thereof may be found at proceedings of the Intermag Conference 1963 K. Heumann: "Pulse control of D.C. and A.C. Motors by Silicon Controlled Rectifiers," 5–1–1—5–1–13.

It will be understood that the above description of the present invention is susceptible to various modifications, changes and adaptations, and the same are intended to be comprehended within the meaning and range of equivalents of the appended claims.

What is claimed is:
1. A circuit arrangement comprising, in combination:
    (a) a first component incorporating a direct current source of electric energy;
    (b) a second component connected across said first component incorporating a load;
    (c) tap means on one of said components and dividing the same into at least two portions;
    (d) a series circuit connected across said one of said components, said series circuit including at least two controllable semiconductor elements connected in series by at least one connector; and
    (e) circuit means connecting said tap means to said connector.

2. A circuit arrangement as defined in claim 1 wherein said series circuit comprises at least two control circuits, one for each of said controllable semiconductor elements.

3. A circuit arrangement as defined in claim 1 wherein said one component is said first component.

4. A circuit arrangement as defined in claim 1 wherein said one component is said second component.

5. A circuit arrangement as defined in claim 1 wherein said series circuit includes more than two controllable semiconductor elements connected by respective connectors, and wherein said tap means include a plurality of taps equal in number to the number of connectors between consecutive controllable semiconductor elements said circuit means connecting each tap to a corresponding one of said connectors.

6. A circuit arrangement as defined in claim 5 wherein said one component is said second component.

7. A circuit arrangement as defined in claim 1 wherein the other of said components includes an inductance.

8. A circuit arrangement comprising, in combination:
    (a) a battery having two terminals and a center tap;
    (b) a load circuit having two terminals and incorporating an inductance;
    (c) a first diode connected between one terminal of said battery and one terminal of said load circuit;
    (d) a second diode connected between the other terminal of said battery and the other terminal of said load circuit;
    (e) a first controllable semiconductor element connected between said one terminal of said load circuit and said center tap of said battery;
    (f) a first control circuit connected to said first controllable semiconductor element;
    (g) a second controllable semiconductor element connected between said other terminal of said load circuit and said center tap of said battery; and
    (h) a second control circuit connected to said second controllable semiconductor element.

9. A circuit arrangement comprising, in combination:
    (a) a source circuit having two source terminals and incorporating a direct current source and an inductance;
    (b) a load having two terminals and at least one tap which is symmetrical with respect to said two load terminals, said source terminals being connected to said load terminals, respectively;
    (c) a series circuit which is connected across said load terminals and incorporating at least two controllable semi-conductor elements;
    (d) a control circuit connected to said controllable semiconductor elements; and
    (e) means connecting said tap of said load with the juncture of said controllable semiconductor elements.

10. A circuit arrangement as defined in claim 9 wherein said series circuit incorporates more than two controllable semiconductor elements, and wherein said load has a plurality of taps equal in number to the number of junctures between consecutive controllable semiconductor elements, each tap being connected to a corresponding one of said junctures.

11. A circuit arrangement as defined in claim 1 wherein said tap means is a single center tap.

12. A circuit arrangement as defined in claim 1 wherein said first component comprises an inductor and a direct current source of electrical energy connected in series with said inductor.

13. A circuit arrangement as defined in claim 1 wherein said second component comprises an inductor and a load connected in series.

14. A circuit arrangement as defined in claim 1, wherein each of said components is, selectively, operable as a load, or as a source of electrical energy.

15. A circuit arrangement as defined in claim 1 wherein said second component is a rotary electric machine.

16. A circuit arrangement as defined in claim 1 wherein said first component is a battery.

17. A circuit arrangement as defined in claim 1 wherein said first component is a bridge circuit rectifier.

References Cited

UNITED STATES PATENTS

| | | | |
|---|---|---|---|
| 3,250,978 | 5/1966 | Moscardi | 318—345 |
| 3,207,974 | 9/1965 | McMurray | 321—45 |
| 3,120,633 | 2/1964 | Genuit | 321—18 |
| 3,127,550 | 3/1964 | Gilbreath et al. | 318—331 |
| 3,141,124 | 7/1964 | Atherton | 320—1 |
| 3,180,974 | 4/1965 | Darling | 323—22 |
| 3,214,667 | 10/1965 | Foster et al. | 318—345 |

OTHER REFERENCES

Bulletin D420–02, Solid State Products, Inc., August 1959, pp. 20–21, Figure 34.

JOHN F. COUCH, *Primary Examiner.*

WARREN E. RAY, *Examiner.*

M. L. WACHTELL, *Assistant Examiner.*